United States Patent [19]

Hisgen et al.

[11] Patent Number: 4,801,676
[45] Date of Patent: Jan. 31, 1989

[54] FULLY AROMATIC THERMOTROPIC POLYESTER IMIDE

[75] Inventors: Bernd Hisgen, Limburgerhof; Hans-Jakob Kock, Ludwigshafen; Michael Portugall, Wachenheim; Erhard Seiler, Ludwigshafen; Gerd Blinne, Bobenheim, all of Fed. Rep. of Germany

[73] Assignee: BASF Aktiengesellschaft, Ludwigshafen, Fed. Rep. of Germany

[21] Appl. No.: 78,668

[22] Filed: Jul. 28, 1987

[30] Foreign Application Priority Data

Aug. 28, 1986 [DE] Fed. Rep. of Germany ....... 3629208

[51] Int. Cl.$^4$ .............................................. C08G 73/16
[52] U.S. Cl. ...................... 528/170; 528/125; 528/128; 528/171; 528/173; 528/184; 528/188; 528/322
[58] Field of Search ............ 528/170, 125, 128, 171, 528/173, 184, 188, 322

[56] References Cited

U.S. PATENT DOCUMENTS

| 3,567,685 | 3/1971 | Bialous et al. ................ | 528/170 |
| 3,637,595 | 5/1969 | Cottis et al. .................. | 260/47 C |
| 4,563,508 | 1/1986 | Cottis et al. .................. | 525/444 |

FOREIGN PATENT DOCUMENTS

| 0033147 | 12/1984 | European Pat. Off. . |
| 0092843 | 7/1986 | European Pat. Off. . |
| 2061304A | 5/1981 | United Kingdom . |

*Primary Examiner*—Harold D. Anderson
*Attorney, Agent, or Firm*—Oblon, Fisher, Spivak, McClelland & Maier

[57] ABSTRACT

Fully aromatic thermotropic polyesters based on
(A) from 30 to 60 mol % of 4-hydroxybenzoic acid,
(B) from 20 to 35 mol % of a mixture of
 (B$_1$) terephthalic acid,
 (B$_2$) isophthalic acid and
 (B$_3$) from 0.5 to 5 mol % of a dicarboxylic acid of the general formula I

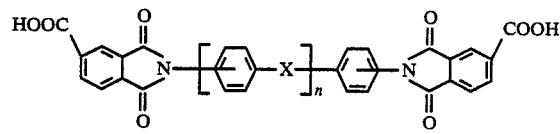

where X is —O—, —S—, —SO$_2$—, —CO—, —CH$_2$— or —C(CH$_3$)$_2$—, n is 0 or 1 and the two imide nitrogen atoms are meta or para to X, or their C$_1$-C$_8$-alkyl, C$_1$-C$_8$-alkoxy, aryl, chlorine or bromine derivatives which are substituted in the nucleus, the molar ratio of B$_1$ to B$_2$ being from 1.04:1 to 19:1, and
(C) from 20 to 35 mol % of a mixture of
 (C$_1$) hydroquinone and
 (C$_2$) 4,4'-dihydroxydiphenyl, the molar ratio of C$_1$ to C$_2$ being from 0.1:1 to 2.67:1 and the molar ratio of B to C being from 0.9:1 to 1.1:1.

6 Claims, No Drawings

FULLY AROMATIC THERMOTROPIC POLYESTER IMIDE

The present invention relates to fully aromatic thermotropic polyesters based on
(A) from 30 to 60 mol % of 4-hydroxybenzoic acid,
(B) from 20 to 35 mol % of a mixture of
($B_1$) terephthalic acid,
($B_2$) isophthalic acid and
($B_3$) from 0.5 to 5 mol % of a dicarboxylic acid of the general formula I

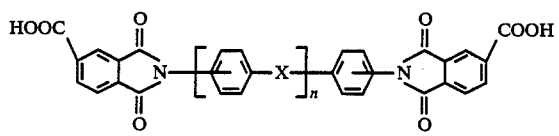

where X is —O—, —S—, —SO$_2$—, —CO—, —CH$_2$— or —C(CH$_3$)$_2$—, n is 0 or 1 and the two imide nitrogen atoms are meta or para to X, or its $C_1$-$C_8$-alkyl, $C_1$-$C_8$-alkoxy, aryl, chlorine or bromine derivatives which are substituted in the nucleus,
the molar ratio of $B_1$ to $B_2$ being from 1.04:1 to 19:1, and
(C) from 20 to 35 mol % of a mixture of
($C_1$) hydroquinone and
($C_2$) 4,4'-dihydroxydiphenyl,
the molar ratio of $C_1$ to $C_2$ being from 0.1:1 to 2.67:1 and the molar ratio of B to C being from 0.9:1 to 1.1:1.

The present invention furthermore relates to a process for the preparation of such polyesters and their use for the production of fibers, films and moldings, and moldings which contain the novel fully aromatic thermotropic polyesters as essential components.

The term thermotropic is used very generally to denote substances which form liquid crystalline melts, i.e. melts having anisotropic properties.

Thermotropic aromatic polyesters obtained from aromatic dicarboxylic acids and dihydroxy compounds, with or without aromatic hydroxycarboxylic acids, are known and are described in, for example, Nos. GB-A-2 061 304, DE-A-20 25 971, EP-A-33 147 and EP-A-92 843. The disadvantage of these known systems is that they have to be prepared by a complicated and time-consuming multistage process. Furthermore, the products generally have melting points above 350° C., which makes processing by a thermoplastic method substantially more difficult.

No. DE-A-35 17 587 describes thermoplastic molding materials which, in addition to a basic resin of an oxy-benzoyl copolyester, contain a fairly small amount of a polymeric flow modifier which consists of terephthalic acid, isophthalic acid, 4-hydroxybenzoic acid, hydroquinone and 4,4'-dihydroxydiphenyl. The flow modifiers described in the Examples have very high melting points on the one hand (Example 3: higher than 400° C.) or, on the other hand, have no crystalline melting point, i.e. possess only slight heat distortion resistance.

It is an object of the present invention to provide fully aromatic thermotropic polyesters which, in comparison with the flow modifiers described in No. DE-A-35 17 587, can be more readily processed by a thermoplastic method and at the same time have improved heat distortion resistance.

We have found that this object is achieved, according to the invention, by the fully aromatic thermotropic polyesters defined at the outset.

The novel fully aromatic polyesters are composed of units derived from 4-hydroxybenzoic acid (A), terephthalic acid ($B_1$), isophthalic acid ($B_2$), a dicarboxylic acid of the general formula I as defined at the outset, hydroquinone ($C_1$) and 4,4'-dihydroxydiphenyl ($C_2$).

The amount of component A is from 30 to 60, in particular from 35 to 55, mol %.

Component B is composed of terephthalic acid ($B_1$), isophthalic acid ($B_2$) and an aromatic dicarboxylic acid ($B_3$) of the general formula I

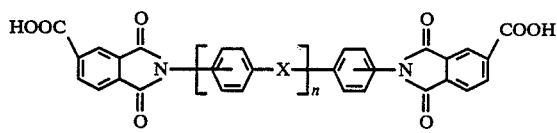

where X is —O—, —S—, —SO$_2$—, —CO—, —CH$_2$— or —C(CH$_3$)$_2$—, n is 0 or 1 and the two imide nitrogen atoms are meta or para to X.

Instead of the unsubstituted dicarboxylic acids, it is also possible to use their $C_1$-$C_8$-alkyl, $C_1$-$C_8$-alkoxy, aryl, chlorine or bromine derivatives.

Examples of such compounds are 1,4-di-(4-carboxy-N-phthalimido)-benzene Ia

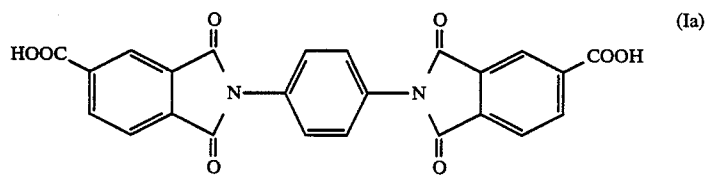

4,4'-di-[(4-carboxy)-N-phthalimido]-diphenylmethane Ib
4,4'-di-[(4-carboxy)-N-phthalimido]-diphenyl sulfone Ic
2,2-di-(4,4'-di-[(4-carboxy)-N-phthalimido]-diphenyl)propane Id
4,4'-di-[(4-carboxy)-N-phthalimido]-diphenyl ether Ie
4,4'-di-[(4-carboxy)-N-phthalimido]-benzophenone If

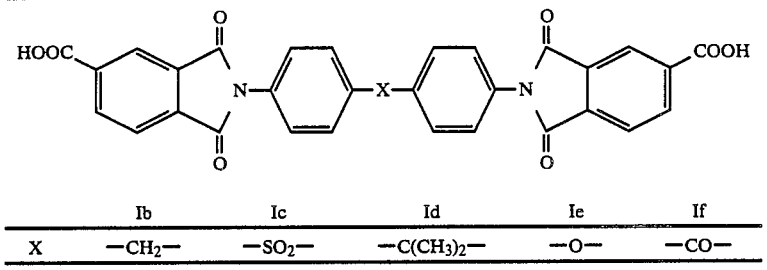

| | Ib | Ic | Id | Ie | If |
|---|---|---|---|---|---|
| X | —CH$_2$— | —SO$_2$— | —C(CH$_3$)$_2$— | —O— | —CO— | and their $C_1$–$C_8$-alkyl, $C_1$–$C_8$-alkoxy, aryl, chlorine and bromine derivatives which are substituted in the nucleus.

In addition to these compounds, in which the imide nitrogen atoms are always para to X, the corresponding meta-substituted compounds or those in which meta- and para-substitution of imide nitrogen atoms and X are present can also be used.

The content of component $B_3$ is from 0.5 to 5, preferably from 1 to 4 mol %.

The molar ratio of components $B_1$ to $B_2$, i.e. of terephthalic acid to isophthalic acid, is from 1.04:1 to 19:1, preferably from 1.5:1 to 10:1.

The total content of component B is from 20 to 35, preferably from 22.5 to 32.5, mol %.

The molar ratio of hydroquinone ($C_1$) to 4,4'-dihydroxydiphenyl ($C_2$) is from 0.1:1 to 2.67:1, in particular from 0.5:1 to 2.33:1, and the content of component C is from 20 to 35, in particular from 22.5 to 32.5, mol %.

The thermotropic, i.e. liquid crystalline, state of the novel fully aromatic polyesters can be demonstrated by a method described in German Laid-Open Application No. DOS 2,520,819, for example using a polarization microscope. Between crossed polarizers, the polymer melts applied in a 10 μm thick layer between glass plates have textures which may be assigned to a mesomorphic phase.

The melting point of the novel polyesters is as a rule from 280° to 350° C., in particular from 300° to 350° C.

The heat distortion point, determined according to ISO/R75, method A, is in general higher than 180° C., in particular higher than 200° C. According to ISO/R75, method B, the heat distortion point is higher than 200° C., in particular higher than 250° C.

The shear modulus, determined according to DIN 53,445, at 200° C., is in general not less than 25%, in particular not less than 28%, of the value measured at 20° C. under otherwise identical conditions.

The relative viscosity of the novel fully aromatic polyesters, determined in 0.1% strength by weight solution in pentafluorophenol at 60° C., is preferably from 1 to 4, in particular from 1.5 to 3.5, dl/g.

The novel thermotropic polyesters can be prepared in principle by conventional processes, as described in, for example, U.S. Pat. Nos. 4,375,530 and 4,118,372.

In an advantageously used process, the starting materials A, $B_1$, $B_2$, $B_3$, $C_1$ and $C_2$ are subjected to a single-stage polycondensation in the melt, in the presence of a 5–60% molar excess of an anhydride of an alkane-carboxylic acid of 2 to 6 carbon atoms. The molar excess of anhydride is based on the total content of OH groups in the monomer mixture.

Among the anhydrides of the alkanecarboxylic acids of 2 to 6 carbon atoms, acetic anhydride, propionic anhydride and butyric anhydride are preferred, acetic anhydride being very particularly preferred. The molar excess of anhydride is preferably from 10 to 50 mol %.

It has also proven advantageous to carry out the reaction under an inert gas atmosphere, for example nitrogen or argon.

In some cases, it is advantageous to accelerate the reaction by using catalysts, for example those described in EP-A-131 846. In this case, the amount of these catalysts is from 0.001 to 1% by weight, based on the total amount of monomers used.

A particularly preferred embodiment of a process is described below.

The monomers A, $B_1$, $B_2$, $B_3$, $C_1$ and $C_2$ and the carboxylic anhydride are mixed under an inert gas atmosphere, and the stirred mixture is refluxed. During this procedure, it is advantageous to increase the temperature stepwise by first maintaining a temperature of 130°–200° C. for up to 5, preferably up to 2, hours and then increasing the temperature to 250°–370° C., preferably in the course of from 2 to 2.5 hours. Excess carboxylic anhydride and carboxylic acids formed are distilled off during the reaction.

In order to achieve as quantitative conversion as possible, it is advantageous to carry out the final phase of the reaction under reduced pressure, preferably under from 0.1 to 200 mbar (from 10 to 20,000 Pa).

The resulting fully aromatic polyesters can then be subjected to postcondensation in the solid phase. This is preferably carried out at from 200° to 300° C., particularly preferably from 200° to 280° C. It is also possible to effect postcondensation in the solid phase after processing by a thermoplastic method.

Advantageously, the condensation in the solid phase is also carried out in an inert gas atmosphere, for example under nitrogen or argon.

In the process described above, fully aromatic polyesters having advantageous properties are obtained in a single stage and in a relatively short time.

The novel fully aromatic polyesters may contain conventional additives and processing assistants. The only ones mentioned here are oxidation stabilizers, heat stabilizers, UV stabilizers, lubricants, mold release agents, dyes and pigments, fibrous and powdered fillers and reinforcing agents, nucleating agents and plasticizers. Additives of this type are known per se and are described in the literature.

Examples of oxidation stabilizers and heat stabilizers include halides of metals of group I of the Periodic Table, if necessary as a mixture with copper(I) halides or sterically hindered phenols, in concentrations of up to 1% by weight.

Suitable UV stabilizers are substituted resorcinols, salicylates, benzotriazoles, benzophenones and mixtures of these, which are generally added in amounts of up to 2% by weight.

Dyes and pigments are generally used in amounts of up to 5% by weight. Nigrosine, titanium dioxide, cadmium sulfide, phthalocyanine dyes, ultramarine blue and carbon black may be mentioned as examples.

Examples of fillers and reinforcing agents are carbon fibers, glass fibers, amorphous silica, calcium silicate, aluminum silicate, magnesium carbonate, kaolin, chalk, powdered quartz, mica and feldspar, which may account for up to 70% by weight, based on the total weight of the filled material.

Examples of nucleating agents are talc, calcium fluoride, sodium phenylphosphinate, alumina and finely divided polytetrafluoroethylene.

Up to 20% by weight of plasticizers, such as phthalates, hydrocarbon oils and sulfonamides, may also be used.

The novel fully aromatic polyesters and the moldings obtainable from them have excellent heat distortion resistance and a smooth, glossy and abrasion-resistant surface coupled with a pale natural color. Moreover, they are substantially resistant to chemicals and flameretardant and, for polyesters, possess excellent stability to hydrolysis.

Moldings produced from the novel fully aromatic polyesters have excellent mechanical properties, in particular rigidity, strength and toughness. The said polyesters are therefore particularly useful for the production of moldings for the electrical industry, electronic computing and accounting machines, automotive construction and other industrial areas.

In addition, the novel polyesters can be converted to fibers and films having a good property spectrum.

The novel polyesters can, as a rule, be processed at below 370° C. by injection molding, pressing or extrusion.

EXAMPLE 1

A novel polyester is prepared using the following components:
  4.5 moles (42.85 mol %) of 4-hydroxybenzoic acid,
  2.4 moles (22.88 mol %) of terephthalic acid,
  0.3 mole (2.85 mol %) of isophthalic acid,
  0.3 mole (2.85 mol %) of 4,4'-di-(4-carboxy-N-phthalimido)diphenylmethane,
  1.8 moles (17.14 mol %) of hydroquinone and
  1.2 moles (11.43 mol %) of 4,4'-dihydroxydiphenyl.

These components were initially taken together with 1,330 ml (14.1 moles) of acetic anhydride in a 5 l reaction kettle under nitrogen. The stirred mixture was then heated to 150° C. in the course of 30 minutes, and then to an external temperature of 350° C. in the course of 150 minutes. Thereafter, the pressure was reduced to 800 mbar and subsequently, in each case in the course of 10 minutes, to half the previous value. The external temperature was increased to 360° C. during this procedure.

The final pressure was 40 mbar after a total reaction time of 230 minutes.

The intrinsic viscosity of the resulting polyester was 2.9 dl/g, measured in 0.1% strength by weight solution in pentafluorophenol at 60° C.

The polyester gave a filament-forming mesomorphic melt.

DSC measurements (differential scanning calorimetry) indicated a melting point of 335° C.

The polymer could be processed without difficulties at 360° C. by injection molding.

The heat distortion point according to ISO/R75, method B, was higher than 250° C.

The shear modulus according to DIN 53,445 at 200° C. was still 28% of the value measured at 20° C. under otherwise identical conditions.

EXAMPLE 2

The following components were used:
  4.5 moles (42.85 mol %) of 4-hydroxybenzoic acid,
  2.4 moles (22.89 mol %) of terephthalic acid,
  0.3 mole (2.85 mol %) of isophthalic acid,
  0.3 mole (2.85 mol %) of 4,4'-di-[(4-carboxy)-N-phthalimido]-diphenyl sulfone,
  1.8 moles (17.13 mol %) of hydroquinone and
  1.2 moles (11.43 mol %) of 4,4'-dihydroxydiphenyl.

The starting compounds were mixed with 1,330 ml (14.1 moles) of acetic anhydride, and reacted as described in Example 1.

The final temperature was 360° C. and the final pressure 65 mbar.

The intrinsic viscosity was measured as 2.3 dl/g, determined as in Example 1.

The melting point (from DSC measurements) was 315° C.

The polymer could be processed without difficulties at 340° C. by injection molding; the heat distortion point according to ISO/R75, method B, was higher than 250° C.

The shear modulus according to DIN 53,445 at 200° C. was still 32% of the value measured at 20° C. under otherwise identical conditions.

COMPARATIVE EXAMPLE 1

(Example 3 of German Laid-Open Application DOS 3,517,587)

The following components were used:
  0.306 mole (50 mol %) of 4-hydroxybenzoic acid,
  0.134 mole (21.85 mol %) of terephthalic acid,
  0.019 mole (3.03 mol %) of isophthalic acid and
  0.154 mole (25.12 mol %) of 4,4'-dihydroxydiphenyl.

The components were reacted with 67.4 ml of acetic anhydride as described in Example 1.

The final external temperature was 360° C. and the final pressure 8 mbar.

In contrast to Examples 1 to 6, in which a filament-forming mesomorphic melt was obtained after the reaction, the reaction product in this case was solid and had a grayish yellow color.

The polymer could not be melted below 400° C. and was insoluble in pentafluorophenol, so that it was impossible to determine the relative viscosity.

A product having the same composition and prepared by the process in No. DE-A-35 17 587 (Example 3) was likewise infusible below 400° C. and therefore impossible to process by a thermoplastic method below this temperature.

COMPARATIVE EXAMPLE 2

(Example 4 from DE-A-35 17 587)

The following components were used:
  0.37 mole (64.92 mol %) of 4-hydroxybenzoic acid,
  0.1 mole (17.54 mol %) of isophthalic acid and
  0.1 mole (17.54 mol %) of 4,4'-dihydroxydiphenyl.

The components were reacted with 62 ml of acetic anhydride as described in Example 1.

The final temperature in this case was 330° C. and the final pressure 53 mbar.

The intrinsic viscosity of the resulting product was 1.9 dl/g, and the polymer had good properties with regard to filament formation from the anisotropic melt.

However, the shear modulus according to DIN 53,445 at 200° C. was only 0.6% of the value measured at 20 ° C. under otherwise identical conditions The above Examples show that the novel fully aromatic polyesters have a substantially improved overall property spectrum, especially when compared with the products disclosed in No. DE-A-35 17 587.

We claim:

1. A fully aromatic thermotropic polyester produced
(A) from 30 to 60 mol % of 4-hydroxybenzoic acid,
(B) from 20 to 35 mol % of a mixture of
   (B$_1$) terephthalic acid,
   (B$_2$) isophthalic acid and
   (B$_3$) from 0.5 to 5 mol % of a dicarboxylic acid of the formula I

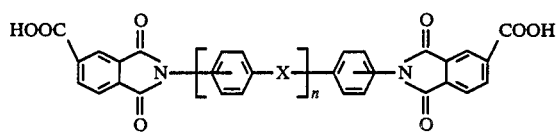

where X is —O—, —S—, —SO$_2$—, —CO—, —CH$_2$— or —C(CH$_3$)$_2$—, n is 0 or 1 and the two imide nitrogen atoms are meta or para to X, or its C$_1$–C$_8$-alkyl, C$_1$–C$_8$-alkoxy, aryl, chlorine or bromine derivatives which are substituted in the nucleus, the molar ratio of B$_1$ to B$_2$ being from 1.04:1 to 19:1, and
(C) from 20 to 35 mol % of a mixture of
   (C$_1$) hydroquinone and
   (C$_2$) 4,4'-dihydroxydiphenyl,
the molar ratio of C$_1$ to C$_2$ being from 0.1:1 to 2.67:1 and the molar ratio of B to C being from 0.9:1 to 1.1:1.

2. A fully aromatic thermotropic polyester as claimed in claim 1, wherein the molar ratio of the components B$_1$ to B$_2$ is from 1.5:1 to 10:1.

3. A fully aromatic thermotropic polyester as claimed in claim 1, wherein the molar ratio of the components C$_1$ to C$_2$ is from 0.5:1 to 2.33:1.

4. A fully aromatic thermotropic polyester as claimed in claim 1, wherein the amount of component B$_3$ is from 1 to 4 mol %.

5. A fully aromatic thermotropic polyester as claimed in claim 1, produced by single-stage polycondensation of components A, B$_1$, B$_2$, B$_3$, C$_1$ and C$_2$ in the melt, in the presence of a 5–60% molar excess, based on the total content of OH groups, of an anhydride of an alkanecarboxylic acid of 2 to 6 carbon atoms.

6. A dimensionally stable molding containing, as an essential component, a fully aromatic thermotropic polyester as claimed in claim 1.

* * * * *